July 9, 1929. O. O. MOORE 1,720,287
FISH HOOK CARRIER AND SPACER
Filed Nov. 2, 1927
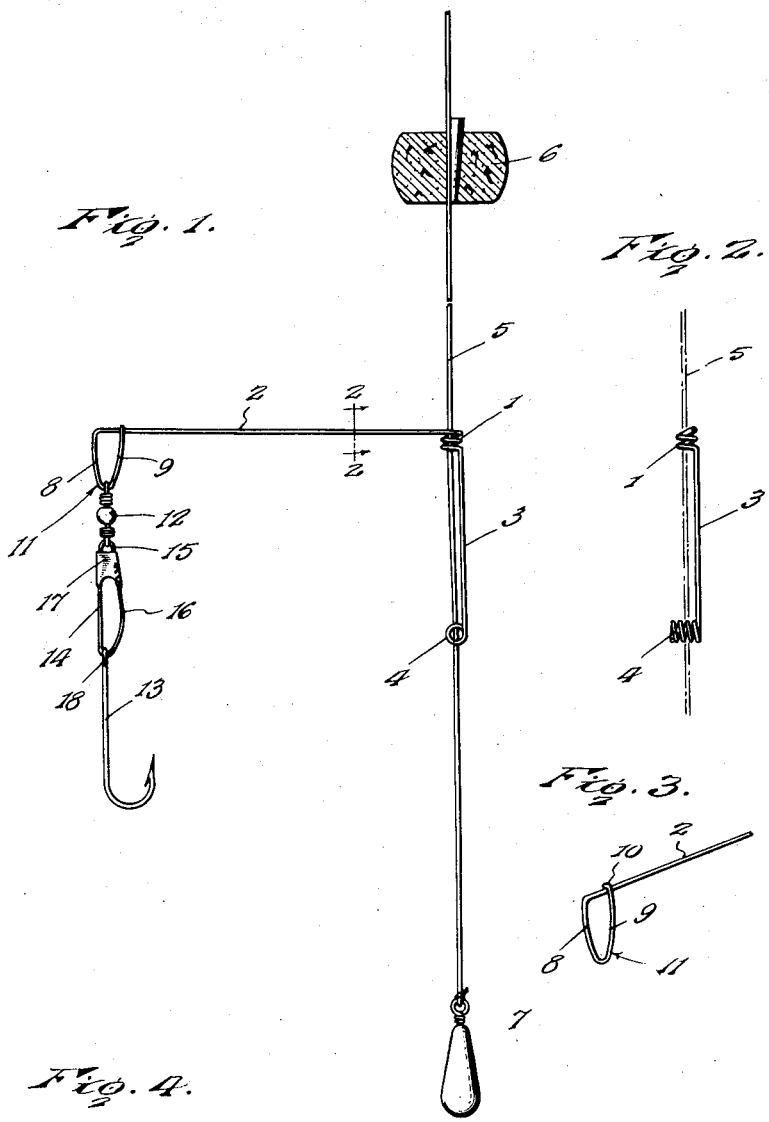
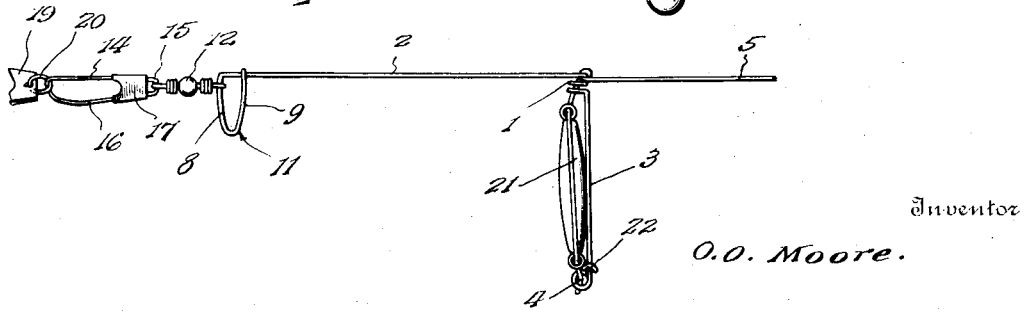

Patented July 9, 1929.

1,720,287

UNITED STATES PATENT OFFICE.

ORVILLE O. MOORE, OF HARTLEY, IOWA.

FISHHOOK CARRIER AND SPACER.

Application filed November 2, 1927. Serial No. 230,623.

This invention relates to fishing and trapping and more particularly to a carrier adapted to be connected with a fishing line and support a hook in spaced relation to the line.

At the present time fish hooks in general use are provided with a leader formed of flexible material, such as gut, and these leaders are secured directly to a fish line. It has been found that, when a hook having a flexible leader is employed, it will very often become entangled with the line or engaged with an adjacent hook due to the flexibility of the leader. This is very annoying to a fisherman as it is necessary to reel in the line and after releasing or untangling the hooks make another cast.

Therefore, one object of the invention is to provide a carrier for a hook which may be connected with a line and includes an arm to extend from the line and support a hook in such spaced relation to the line that it cannot become entangled with the line or another hook.

Another object of the invention is to permit the carrier to be easily applied to a line and adjusted longitudinally thereon and releasably secured in a set position.

Another object of the invention is to form the hook carrier from a strand of resilient wire so that it may be cheaply produced and at the same time very efficient in its operation.

Another object of the invention is to provide the device with an improved hook-engaging link suspended from the arm which projects from the fish line and adapted to support a hook but permit the hook to be easily removed so that a larger or smaller hook may be substituted for one already in use or a broken hook removed and a new one substituted.

The invention is illustrated in the accompanying drawing, wherein

Figure 1 is a view in side elevation showing the improved fish hook support applied to a line;

Fig. 2 is a sectional view taken on the line 2—2 of Fig. 1 and showing the line-engaging portion of the device in elevation;

Fig. 3 is a perspective view of the outer end portion of the arm which projects from the line, and Fig. 4 is a view showing the manner of attaching the device to a line when casting instead of still fishing as shown in Fig. 1.

The improved fish hook carrier and spacer consists of a strand of resilient wire which is coiled intermediate its length to provide an eye 1 having arms 2 and 3 projecting from opposite ends of the eye at right angles to each other. The free end portion of the arm 3 is coiled, as shown in Fig. 2, to provide an eye 4 so that, when a fish line 5 is threaded through the eye 1, a portion of the line may be engaged between the convolutions of the eye 4 which will grip the line and securely retain the device in a set position upon the fish line. It will thus be seen that, when used for still fishing, the device may be applied to the line, as shown in Fig. 1, between the float 6 and sinker 7 and secured in desired spaced relation to the sinker and float. It will also be obvious that any number of the devices may be applied to the line in spaced relation to each other longitudinally thereof. In view of the fact that the convolutions of the eye 1 are spaced from each other as shown in Figs. 1 and 2, the fishing line may be moved between the convolutions until it is threaded through the eye. Therefore, the device may be applied or removed without disconnecting the sinker or float from the line.

The arm 2 projects transversely from the fishing line and has its free end portion bent transversely as shown at 8 and then back in spaced relation to itself, as shown at 9, with its extreme end bent to form a bill 10 which overlaps the arm 2, as shown in Fig. 3. This provides an eye 11 which tapers towards its outer end and carries a swivel 12 of a conventional construction. In view of the fact that the bill 10 overlaps the arms, the swivel may be easily applied to or removed from the eye 11 but it will not be liable to easily work loose. The swivel may extend downwardly from the eye in depending relation thereto, as shown in Fig. 1, when still fishing or it may extend from the eye longitudinally of the arm, as shown in Fig. 4, when casting.

In order to engage and support a hook 13, there has been provided a link 14 which is formed of resilient wire bent adjacent one end to provide an eye 15 and having its other end portion folded back in spaced relation to itself to provide a bill 16. A shield 17 which is formed of sheet metal is engaged with the shank and eye-forming portion of the wire from which the link is made and is of sufficient length to be engaged by the free end portion of the bill. This shield is somewhat similar to those employed upon safety pins and when the bill 16 is engaged with the shield after being passed through the eye 18 of the hook the hook will be securely held upon the link and prevented from accidentally becoming detached therefrom. When however, it is desired to substitute a new hook for one which has become broken or rusted or it is desired to substitute a larger or smaller hook for one already in use, the bill can be easily released and the hook removed and a new one substituted.

When the device is employed for still fishing, it is applied to the fish line between the cork and sinker, as shown in Fig. 1, with the arm 2 projecting transversely from the line and the hook will be suspended in spaced relation to the line. By referring to Fig. 1, it will be seen that the hook is disposed in such spaced relation to the line that it may have swinging movement toward and away from the line without becoming entangled therewith. Therefore, the line may be cast into the water and carried downwardly by the sinker without the hook becoming entangled with the line or engaged with another hook. Since the line is frictionally gripped between the coils of the eye 4, the device may be adjusted longitudinally upon the line so that it will be disposed in proper spaced relation to the sinker and float at the proper distance from another hook if two or more hooks are employed and securely fastened in a set position. If the fisherman desires to fish by casting instead of still fishing, the hook 13 is removed from the link and a spoon hook 19 connected with the link by passing the bill of the link through the ring or eye 20 of the spoon hook. Instead of applying the device to the line as shown in Fig. 1, the line is threaded through the eye 1 and then passed through the eyes of a sinker 21 which is disposed longitudinally of the arm 3 and has its end portion engaged between coils of the eye 4, as shown at 22. When the device is attached to the line for casting, as shown in Fig. 4, the arm 2 will project from the line longitudinally thereof and the spoon hook will be disposed in such spaced relation to the line that it cannot easily become entangled with the line when making a cast. It should also be noted that when the line is reeled in after making a cast the swivel 12 will extend from the eye 11 longitudinally of the arm 2 and the spoon hook will be drawn through the water after the line in the usual manner.

Having thus described the invention, I claim:

1. A fish hook carrier comprising a strand of resilient wire coiled intermediate its length to form an eye adapted to slidably receive a fish line and arms extending from the end of the eye transversely of each other, one arm having its free end portion coiled to provide an eye extending transversely thereof and adapted to have a portion of a fish line engaged between its coils and secure the device in a set position upon the line with the said arm extending longitudinally of the line and the second arm projecting transversely from the line, the second arm having its free end portion bent to provide an eye depending from the arm transversely thereof and adapted to have a hook suspended from its lower free end.

2. A fish hook carrier comprising a strand of resilient wire coiled intermediate its length to form an eye adapted to receive a fish line and arms extending from the end of the eye transversely of each other, one arm having its free end portion coiled to provide an eye disposed transversely of the arm and adapted to have a portion of a fish line engaged between its coils and secure the device in a set position upon the line with the second arm projecting transversely from the line, the second arm having its free end portion bent transversely and then back in spaced relation to itself to overlap the arm and define a depending eye extending transversely from the arm and tapered towards its lower end, a swivel engaged in said tapered eye, and a hook-engaging member carried by said swivel and extending longitudinally therefrom.

In testimony whereof I affix my signature.

ORVILLE O. MOORE. [L. S.]